United States Patent [19]

Stingelin et al.

[11] 4,172,974
[45] Oct. 30, 1979

[54] UNDERWATER WELDING APPARATUS

[75] Inventors: Valentin Stingelin, Vandoeuvres; Jean-Pierre Budliger, Onex; Jean Katzarkoff, Versoix; Guido Walt, Allschwil; Rolf Roggen, Petit-Lancy, all of Switzerland

[73] Assignee: Battelle Memorial Institute, Carouge-Geneva, Switzerland

[21] Appl. No.: 773,167

[22] Filed: Mar. 1, 1977

[30] Foreign Application Priority Data

Mar. 5, 1976 [CH] Switzerland ............... 2744/76

[51] Int. Cl.² .................................................... B23K 9/32
[52] U.S. Cl. ................................... 219/72; 219/74; 219/137 R; 405/154
[58] Field of Search ................... 219/72, 74, 137 R; 61/69 R

[56] References Cited

U.S. PATENT DOCUMENTS

| | | | |
|---|---|---|---|
| 4,035,602 | 7/1977 | Berghoe | 219/137 R X |
| 4,039,798 | 8/1977 | Lythall | 219/137 R X |
| 4,052,632 | 10/1977 | Sagara | 219/137 R |

FOREIGN PATENT DOCUMENTS 161815 4/1921 United Kingdom .............. 219/72

Primary Examiner—E. A. Goldberg
Attorney, Agent, or Firm—Karl F. Ross

[57] ABSTRACT

A tool for underwater welding comprises an open-mouthed bell with an axially extending electrode inside, part of that electrode being surrounded by a tube supplying gas under pressure from a pumping station floating on the surface. Another tube linking the bell with that pumping station supplies water under pressure to an annular chamber open toward an array of fluid-guiding blades carried by the bell. In one embodiment, the bell is rotatably mounted and carries the blades on its outer surface, being set in rotation by the oncoming flow; in another embodiment, the bell is stationary and the blades are arranged on its inner surface whereby the water swirls in a film along that surface. In either case the circulating water forms a vortex that passes along the bell periphery and around the bell mouth which is slightly spaced from the workpiece to be welded, the resulting centrifugal forces preventing the entry of surrounding water into the bell whereby a gaseous atmosphere is maintained in its interior.

13 Claims, 7 Drawing Figures

UNDERWATER WELDING APPARATUS

FIELD OF THE INVENTION

Our present invention relates to an apparatus designed to facilitate work on submerged objects.

Underwater operations are undergoing a considerable expansion linked to the increase in prospecting for and working of hydrocarbon deposits at sea by offshore technology. The essential part of the manufacturing and construction operations involved in platforms or underwater pipelines is at the present time carried out outside the water. However, certain installation and maintenance operations can only be effected under water.

This is particularly so in the case of welding, oxygen-torch cutting, the application of certain coatings by plasma spraying, spray-painting, etc. Of these operations, arc welding without doubt poses a particularly complicated problem because of the disturbing influence of water on the welding process, in particular on the arc stability, which has repercussions on the weld quality. The welding arc behaves differently under water than in open air. As soon as the arc is established under water, the combustion of the electrode coating materials and the evaporation and decomposition of the water form gas bubbles around the arc. When the pressure of these bubbles become sufficient, they leave the arc region and rise towards the water surface. The current thus created affects the arc stability. The hydrogen originating from the decomposition of the water by the effect of the heat emitted by the arc penetrates into the molten metal and makes the weld seam more fragile. The presence of water causes tempering of the weld seam due to the sudden cooling which it produces.

Various attempts have been made to remedy these disadvantages. One of these consists in recreating the open-air welding conditions by means of a controlled atmosphere in a sealed enclosure adjacent to the surface to be welded. This enclosure, designed to receive the welder, requires a large volume.

This method is extremely costly and inflexible inasmuch as it is not possible to move the enclosure during the course of the operation. Each movement means breaking the seal, recreating the seal, and reforming a controlled atmosphere, with all the difficulties, time losses, and work which these operations entail. The welding methods used in such an inhabited enclosure are limited essentially to the tungsten inert-gas (TIG) process, in which no filler metal is used, and possibly the metal/inert-gas (MIG) process, but welding with slag cannot be used because of the emission of harmful gas which would make the atmosphere in the enclosure or bell unbreathable and cause poor visibility.

According to another prior proposal, a small hemispherical bell of the order of 5 cm diameter is held against the surface to be welded; the electrode is inserted through this bell and the gas produced during welding is used to remove the water from the proximity of the arc. This experimental process has given good results with coated electrodes where the coating contains a high proportion of powdered iron, but presents difficulties on an industrial scale. It is sensitive to spatial orientation, because of gravity, and is limited to electrodes capable of producing a sufficient volume of gas.

The fumes filling the bell during welding impair visibility. Moreover, the process is limited to one particular welding operation to the exclusion of any other operation which does not evolve gas.

Finally, French patent No. 2,197,689 and German patent No. 2,342,648 propose a welding torch for underwater welding, surrounded by a double bell whose edges are inclined outwardly and define therebetween an annular nozzle. The space between the two bells is connected to a source of water under pressure, while the bell interior is connected to a source of inert gas such as argon. When the pressurized water is introduced into the space between the two bells while the welding torch is submerged, the water leaves this space through the annular nozzle to form an outwardly inclined sheet. This sheet exerts a pumping effect on the fluid inside the bell. As the argon or other welding gas is fed into the inner bell simultaneously, an inert atmosphere is formed. However, to maintain this gas pocket the pumping action of the water sheet must be uninterrupted, so that once the water is evacuated from the inner bell it is the gas that is pumped, the water being prevented from re-entering the bell in that an outflow from the interior of the bell opposes its entry. The stability of the gas pocket thus formed is directly dependent on the speed of flow of the water sheet. The higher this speed, the greater the pumping effect, so that the gas consumption grows on the one hand as a function of this speed, and on the other hand proportionately to the depth. High gas consumption is an obstacle in underwater welding processes, because visibility decreases as a function of the quantity of bubbles escaping from the bell. This is one of the problems encountered with that process and has been solved only by creating an automatic welding station with remote control, necessitating a costly installation which is complicated in use. Moreover, this process is very sensitive to the position of the bell, and the formation of the gas pocket with the bell aperture vertical has proved very difficult.

OBJECT OF THE INVENTION

The object of the present invention is to provide a device which at least partly remedies the disadvantages of known techniques.

SUMMARY OF THE INVENTION

An apparatus according to our invention, for operating on workpieces submerged in water or some other surrounding liquid, comprises a bell immersed in that liquid whose mouth is confrontable with a surface of the workpiece in order to allow work to be performed thereon by a tool such as a welding electrode disposed in the bell. A mounting for the tool traverses the bell, at a location remote from its mouth, in a fluidtight manner; through a conduit, fluid under pressure is delivered by external pump means to the bell for maintaining a gaseous atmosphere in its interior to permit the desired operation (e.g. welding) to be performed. Pursuant to our present improvement, a fluid vortex centered on the bell axis is generated by fluid-guiding means disposed in the path of a fluid stream emitted by the conduit, this vortex passing along an outer or inner peripheral surface of the bell and around its mouth with exertion of centrifugal forces upon the surrounding liquid to prevent its entry into the interior of the bell through a clearance separating that bell mouth from a confronting workpiece surface.

In accordance with a more particular feature of our invention, applicable to a device in which the tool is a welding electrode extending axially toward the bell mouth, the conduit includes a first tube entering the bell axially through the electrode mounting and surrounding part of the electrode while terminating short of the bell mouth; a second tube of the conduit terminates at an annular chamber, centered on the bell axis, which is open toward an annular array of blades skew to the axis that constitute the aforementioned fluid-guiding means. The bell, carrying this array of blades on its outer surface, may be rotatably mounted on the first tube for entrainment by the blades set in rotation by the fluid stream emitted by the second tube. Alternatively, the emitted fluid—which is advantageously identical with the surrounding liquid, namely water—passes into the body of the bell where it is set in rotation by the array of blades disposed in its interior, the bell being then rigid with the electrode mounting.

The main advantages of the apparatus according to our invention are immediately obvious. They are its insensitivity to position, the creation of a controlled atmosphere, the possibility of making a continuous weld on a dry surface, and the creation of a working region of good visibility. Further, advantages of the invention will become apparent hereinafter.

BRIEF DESCRIPTION OF THE DRAWING

The accompanying drawing illustrates, very diagrammatically and by way of example, two embodiments and modifications of the device according to the present invention. In the drawing.

SPECIFIC DESCRIPTION

Figure 1:
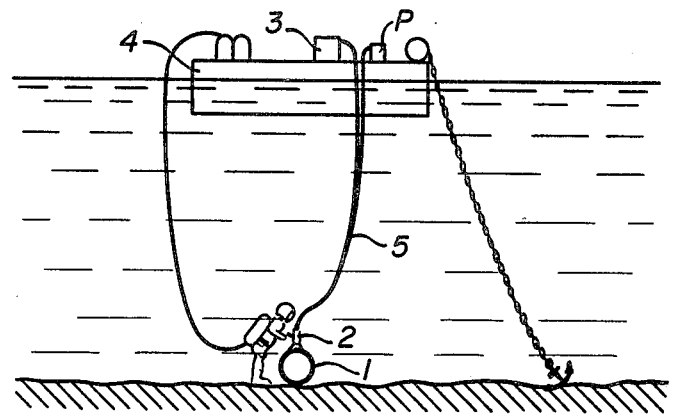
FIG. 1 is a view of an underwater welding installation.

FIG. 1 shows one particular application of the present invention to the welding of an underwater pipe. This Figure shows a pipe 1 which a diver is in the process of welding with an arc-welding torch 2 provided with means according to our invention for forming a pocket of gas adjacent to the surface of the pipe 1. To this end, the torch 2 is connected to a welding station 3, situated on a barge 4, by a multiple conduit 5 comprising an electrical conductor for connecting the welding electrode to the voltage source on station 3, a tube for feeding the torch with welding gas under pressure, the source of this gas being part of the welding station 3, and a further tube fed by a pump P whose purpose will be explained hereinafter.

Figure 2:
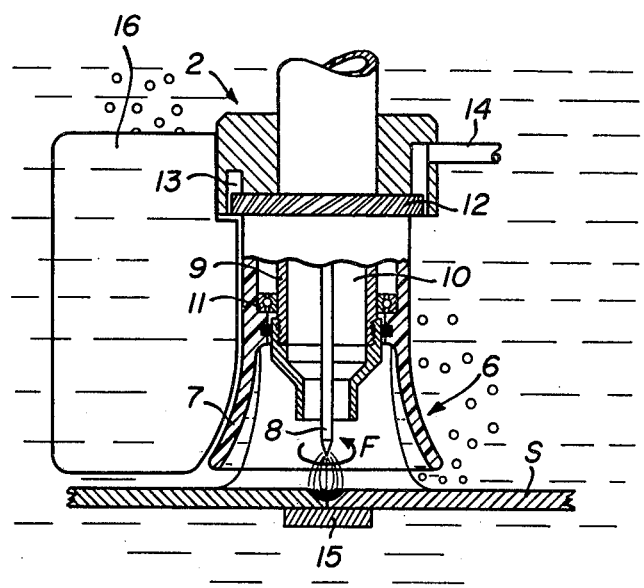
FIG. 2 is a vertical section through a first embodiment of our invention designed as a welding torch.

FIG. 2 is a more detailed view of the end of welding torch 2 associated with a device 6 for creating a pocket of gas adjacent to the portion of surface S to be welded. The device 6 comprises a bell 7 which may consist of Plexiglas (or Perspex) or other transparent material if the operator is to be able to observe the working region, mounted at the end of the torch 2 which includes an electrode 8 housed in a turbular sheath 9 forming a gas-feed conduit 10 connected to the welding station 3 of FIG. 1 by the gas-supply tube of the multiple conduit 5.

Bearings 11, only one of which is shown in FIG. 2, are disposed between the sleeve 9 and bell 7 to enable the latter to rotate. The upper end of this bell has an annular array of fluid-guiding blades 12 disposed skew to the bell axis at the outlet of an annular chamber 13 with a helically descending roof fed by a conduit 14 connected to the pump P of FIG. 1 by the second tube 14 of conduit 5. Finally, a baffle 16, the purpose of which will be explained hereinafter, extends radially outwardly from the body of torch 2 (i.e. the mounting of tube 9) with reference to the axis of the bell 7. The formation of the pocket of gas is obtained by placing the bell in proximity to the surface S with all-around clearance from that surface. The device 2,6 may be provided with a rest to fix a certain distance between the edge of the bell 7 and the surface S. However, it will be clear subsequently that such a rest is not essential. It may be useful, particularly when the edges of the plates to be welded are irregular, to place a shield 15 on the side opposite the welding side, in order to reduce the flow of water drawn into the bell 7 through the gap separating the workpiece sections to be welded. The axially (i.e. vertically narrowing) chamber 13 is fed with water under pressure, if the surrounding liquid is water, as in nearly all applications of the invention envisaged by us, and simultaneously the conduit 10 is fed with gas whose nature may vary according to the type of welding required. The pressurized water leaving the chamber 13 encounters the blades 12 which transform this water pressure into a tangential force applied to the bell 7 to turn it in the direction of the arrow F. The rotation of this bell is progressively transmitted by friction to the water, in particular to the volume of liquid situated in the bell 7. The vortex movement of the water creates centrifugal forces which tend to evacuate the water through the passage formed between the edge of the bell 7 and the surface S of the piece to be welded. Thus, the body of water originally present in the bell is transformed into a tubular sheath spacedly surrounding the tool 8, as shown. As gas under pressure is simultaneously fed into the bell through the conduit 10, the water leaving the bell 7 is replaced by gas entering the liquid-free spaced around the axis, thereby creating a pocket of gas inside the bell which enables the arc formed between the electrode 8 and the surface S to operate in a controlled atmosphere of predetermined composition. Once the water has been expelled from the bell and the gas pocket has formed, the rotation of the bell serves to maintain equilibrium between the surrounding water and the gas pocket. The gas flow is, of course, constant so that bubbles escape continuously from the bell 7. Because of the rotation of the water, the bubbles are also made to rotate so that they describe a sort of helix while swirling in the direction of the arrow F as they emerge from the bell 7. In order to provide a region of good visibility, the radial baffle 16 is placed to intercept the bubbles so that a more or less bubble-free zone is preserved on the other side of the baffle 16. This is obviously only one of the means which can be conceived for solving the visibility problem.

Figure 3:
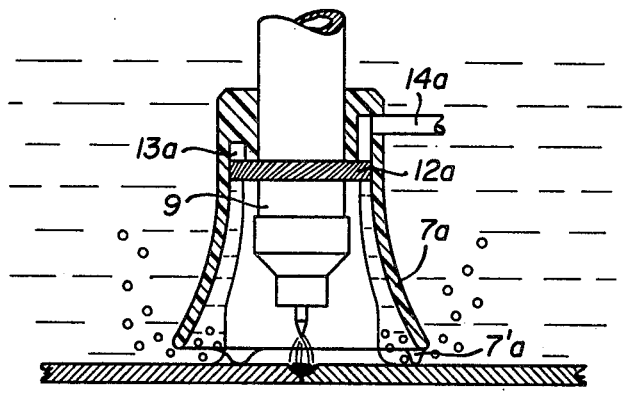
FIG. 3 is a view similar to FIG. 2, showing a second embodiment.

The embodiment shown in FIG. 3 differs only slightly from the preceding one. In this second case, the bell 7a is fixed to the tubular sleeve 9. Blades 12a are disposed inside the bell 7a, between the tubular sleeve 9 of the torch 2 and the inner face of the bell, at the outlet of an axially narrowing chamber 13a provided in the bell and force-fed with water by a tube 14a connected to the pump P of FIG. 1 as part of the multiple conduit 5. The torch itself is absolutely identical to that of FIG. 2. In this second embodiment, the water leaving the annular chamber 13a under pressure from pump P is given a vortex movement transmitted to it by the inclination of the stationary deflecting blades 12a. This water progressively transmits a vortex movement to the fluid contained in the bell, this movement inducing centrifugal forces which cause the water to pass in an annular flow along the inner peripheral bell surface to the mouth of the bell, the water then being replaced progressively by the gas fed in through the conduit 10. An equilibrium condition is established in which the bell contains a pocket of gas surrounded by a film of water lying against the walls of the bell, as shown in the drawing. The presence of this film of water on the inner face of the bell provides protection against weld spatter and ensures that the bell remains transparent and consequently that the welding zone remains visible.

Figure 4:
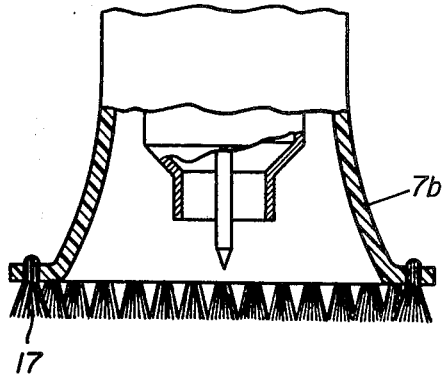
FIG. 4 is a view similar to FIG. 2 showing a modification of this embodiment.

FIG. 4 shows a modification of the embodiment of FIG. 2, in which the edge of the bell 7b comprises an annular rim carrying uniformly distributed tufts of hair 17. These tufts are separated by spaces which enable the water and gas to leave the bell. Furthermore, they enable the bell to adapt itself better to the irregularities of the surface to be welded. The presence of these tufts helps equilibrium to be established between the water surrounding the bell and the internal pocket of gas. In contrast to the aforementioned prior-art system using a pumping effect, the centrifugation utilized in the apparatus according to the invention enables equilibrium to be established between the inside and the outside of the bell without any outflow along the interface of the two media. A certain gas consumption is necessary, to be sure, for the welding process in order to create a controlled atmosphere for arc formation, but the stability of the gas pocket does not depend on the speed of discharge of the gas. Consequently, the bubble density can be reduced and visibility improved.

Figure 5:
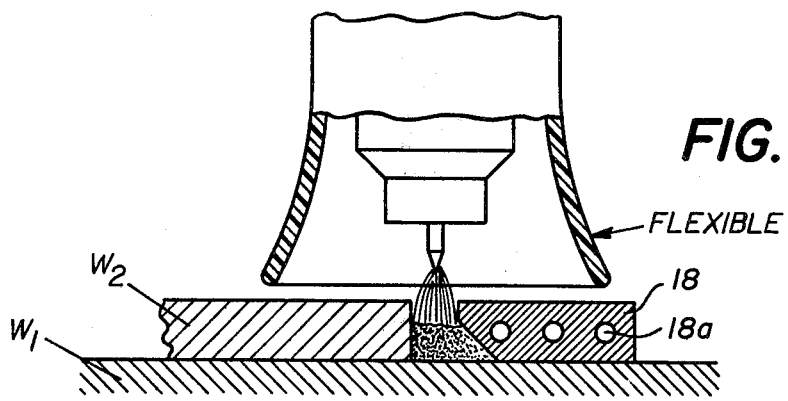
FIGS. 5 and 6 show two applications of our invention to a process for welding lapped pieces and mutually perpendicular pieces, respectively.
Figure 6:
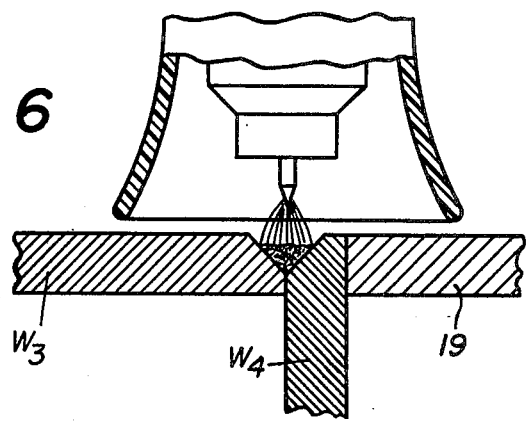

The operation of the apparatus according to the invention is obviously dependent on maintaining a uniform space between the edge of the workpiece bell and the surface confronting the bell mouth. There are two other instances of welding besides those previously illustrated, namely lap welding as shown in FIG. 5 and welding of angularly adjoining pieces as shown in FIG. 6, in which the bell cannot always be utilized as it stands.

In these two cases, the difficulty can be overcome by using extensions. This, if the workpiece sections $W_1$ and $W_2$ are to be joined as in the example of FIG. 5, a wedge 18 may be used with channels 18a for the circulation of a cooling fluid so that the piece 18 does not become welded As these sections. In welding pieces $W_3$ and $W_4$ at a right angle as shown in FIG. 6, a support plate 19 may extend the surface of workpiece section $W_3$ in order to form a continuous surface opposite the bell mouth.

Certain advantages of the present invention can be deduced from the preceding description. These include the fact that the welding may be carried out continuously by manual means, with good visibility, without the need for any preliminary preparation. Different types of welding may be used, whether they produce gas and fumes, as in the coated-wire MIG processes, or do not produce gas as with TIG processes but require argon or helium for forming the arc plasma. The type of gas fed to the bell may be adapted to the arc-welding process chosen. Slag processes can be used because of the continuous fume evacuation, while TIG processes can be used because of the gas feed to the interior of the bell.

With the TIG process, the welder needs only to control the position of the bell during welding, the electrode position remaining fixed inside the bell.

With the MIG process, in which the electrode is a wire or rod which provides the metal, the electrode feed may be continuous. Welding machines are commercially available which are designed to adjust the welding parameters such as the arc voltage as a function of the arc characteristics. In this manner the welder controls only the positioning and translation movement of the welding bell. This simplifies the manual welding operation to the greatest possible extent.

The described process not only enables a controlled atmosphere to be created around the arc, but makes underwater welding almost as simple as welding out of water, as the process in practice requires no particular preparation. The formation of the gas pocket is almost instantaneous and welding can be immediately carried out. It should be noted that maintaining the distance between the edge of the bell and the workpiece surfaces does not pose any great problem as the bell encounters a certain resistance on approaching that surface, on the one hand because of the water centrifuging between the edge of the bell 7 and the surface S, and on the other hand because of the gas expelled from the bell. However, in order to guarantee a certain uniformity of the clearance between the edge of the bell and the surface to be welded, rests may be provided. These may be projections 7'a formed on the rim of the bell, as shown in FIG. 3, where the bell is stationary. If the bell is of the rotatable type, as in FIG. 2, a tripod (not shown) may be fixed to the tubular sleeve 9. However, a skilled worker could dispense with such guides. With the modification shown in FIG. 4, the brush hairs are placed on the workpiece surface and precisely fix the distance between the electrode and this surface. The process may be carried out in any position of the bell, whether its axis of revolution is vertical or horizontal, and whether the surface to be welded is below or above the bell. This insensitivity of the process to the force of gravity constitutes without doubt one of its most important characteristics. Heretofore, only processes using sealed bells have had this advantage, at an enormous cost.

This insensitivity to position derives from the fact that, in constrast to static processes that use gas pressure to evacuate the water from the bell and are therefore sensitive to gravity, the operation of our improved device creates an overpressure by dynamic means so that the gas pocket inside the bell is independent of position, only the mass flow of gas increasing with depth. This dynamic pressure is applied circumferentially and independently of the position of the bell in space; only the gas pocket remains sensitive to this positioning, but as the differential pressure may be low relative to the water pressure, the influence of gravity is not an obstacle.

Tests have been carried out with this process, using a rotatable plexiglass (Perspex) bell of 6 cm diameter to weld structural steel plates 5 mm thick. The welding was carried out with one or two passes, one on each side of the plates, with the aid of a tungsten electrode and a flow of argon.

Figure 7:
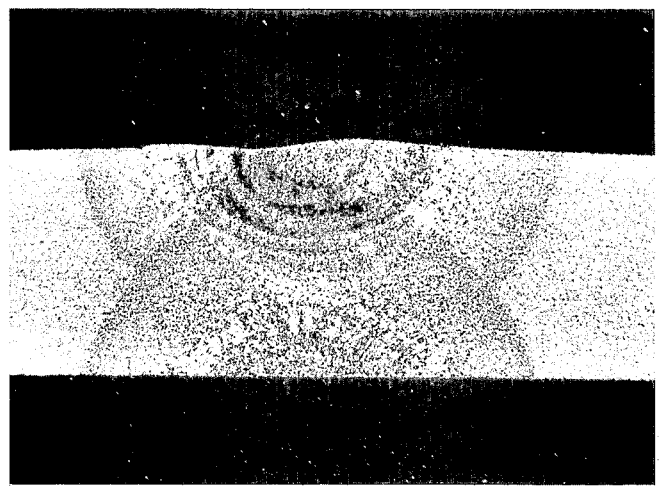
FIG. 7 is a metallographic representation of a weld made by an apparatus according to the invention.

The electrode, connected to the positive pole of a source of direct current, was fed with a current of 150 A for the first pass and 100 A for the second pass. The speed of advance of the torch was 7 cm/min in the two cases and the argon flow was 28 liters/min. The speed of rotation of the bell was about 2500 RPM and the space between the edge of the bell and the plate was 1.5 to 2 mm, the arc having a length of 2.5 mm. FIG. 7 shows a metallographic representation of the weld obtained. Hardness measurements on this weld gave results varying from 216 to 303 μHV measured with a weight of 50 g, the hardness of the welded steel plates being about 230 μHV. Furthermore, the welds obtained by the process described above show practically no porosity, as proved by the metallographic representation, such porosity being a defect frequently encountered in welds made under water. Finally, the very good uniformity of the weld seam should be noted.

Further tests were carried out with a fixed bell, creating the vortex by jets. These tests demonstrated that it was possible to obtain substantially the same conditions as with the rotating bell by maintaining the edge of the bell at a distance of 2 to 4 mm from the surface.

The process described may equally be applied to other underwater operations, and notably to oxyacetylene cutting, sand-blasting or grit-blasting, and generally to any operation on a submerged surface which has to be cleared of liquid.

If desired, the entire bell 7 or 7a, or at least the part defining the ball mouth, could also be constructed of a transparent or opaque flexible material such as polyethylene or rubber, for example, as indicated in FIG. 5. The advantage of this deformability is to enable the bell to be adapted to surface irregularities or to a non-flat surface such as the curvature of a pipe, for example. This advantage may also be obtained with the aid of the modification of FIG. 4.

What we claim is:

1. An apparatus for operating on workpieces submerged in a surrounding liquid, comprising:
   a bell immersible in said liquid and provided with a mouth confrontable with a surface of a submerged workpiece, said mouth being centered on an axis;
   tool means in said bell for operating on said workpiece;
   mounting means for said tool means traversing said bell in a fluidtight manner at a location remote from said mouth;
   an external source of gas communicating with the interior of said bell in the vicinity of said tool means;
   external pump means for the delivery of a liquid under pressure;
   a supply tube linking said pump means with the interior of said bell, said bell having an annular chamber at a location remote from said mouth for receiving the liquid from the said supply tube and fluid guiding means adjacent said chamber for setting the liquid in a rotary motion substantially along the total length of the inner peripheral surface of said bell to generate a liquid vortex around said mouth with exertion of centrifugal forces upon the surrounding liquid to prevent same from entering said interior through a clearance separating said mouth from a confronting workpiece surface while creating a liquid-free space around said tool means for the entry of gas from said source.

2. An apparatus as defined in claim 1 wherein said tool means comprises a welding electrode extending toward said mouth along said axis, said source communicating with said interior via another tube entering said bell axially through said mounting means and surrounding part of said electrode while terminating short of said mouth, said fluid-guiding means comprising an annular array of blades skew to said axis surrounding said another tube, said mounting means being rigid with said bell and forming an annular chamber centered on said axis and open toward said array.

3. An apparatus as defined in claim 2 wherein said annular chamber narrows axially with increasing distance from a junction with said second tube.

4. An apparatus as defined in claim 2 wherein said pump means comprises a water pump connected to said supply tube.

5. An apparatus as defined in claim 1 wherein said bell consists of a flexible material at least in the vicinity of its mouth.

6. An apparatus as defined in claim 1 wherein said bell is provided with support means for keeping said mouth spaced from the surface of said workpiece.

7. An apparatus for operating on workpieces submerged in a surrounding liquid, comprising:
   a bell immersible in said liquid and provided with a mouth confrontable with a surface of a submerged workpiece, said mouth being centered on an axis;
   tool means in said bell for operating on said workpiece;
   mounting means supporting said tool means and traversing said bell in a fluidtight manner at a location remote from said mouth, said bell being rotatably carried by said mounting means;
   an external source of gas communicating with the interior of said bell in the vicinity of said tool means;
   external pump means provided with conduit means extending to said mounting means for discharging a flow of liquid under pressure into the surrounding liquid in the immediate vicinity of said bell; and
   fluid-guiding means on said bell disposed in the path of said flow for setting said bell in rotation about said axis with rotary entrainment of a body of liquid admitted into said bell by way of said mouth whereby said body is centrifugally transformed into a sheath spacedly surrounding said tool means within said bell and preventing the surrounding liquid from entering said interior through a clearance separating said mouth from a confronting workpiece surface while creating a liquid-free space around said tool means for the entry of gas from said source.

8. An apparatus as defined in claim 7 wherein said tool means comprises a welding electrode extending toward said mouth along said axis, said source communicating with said interior via a first tube entering said bell axially through said mounting means and surrounding part of said electrode while terminating short of said mouth, said fluid-guiding means comprising an annular array of blades skew to said axis on an outer peripheral surface of said bell, said mounting means being provided with an annular chamber centered on said axis and open toward said array, said conduit means including a second tube terminating at said annular chamber.

9. An apparatus as defined in claim 8 wherein said annular chamber narrows axially with increasing distance from a junction with said second tube.

10. An apparatus as defined in claim 8 wherein said pump means comprises a water pump connected to said second tube.

11. An apparatus as defined in claim 7 wherein said bell consists of a flexible material at least in the vicinity of its mouth.

12. An apparatus as defined in claim 7 wherein said bell is provided around said mouth with a set of fine filaments extending generally parallel to said axis.

13. An apparatus as defined in claim 7, further comprising a stationary baffle secured to said mounting means and extending generally radially outside said bell for intercepting gas bubbles circulating therearound.

* * * * *